Oct. 1, 1940.   V. J. CHAPMAN   2,216,564
ARC WELDING
Filed Sept. 16, 1938   2 Sheets-Sheet 1

Inventor:
Verni J. Chapman,
by Harry E. Dunham
His Attorney.

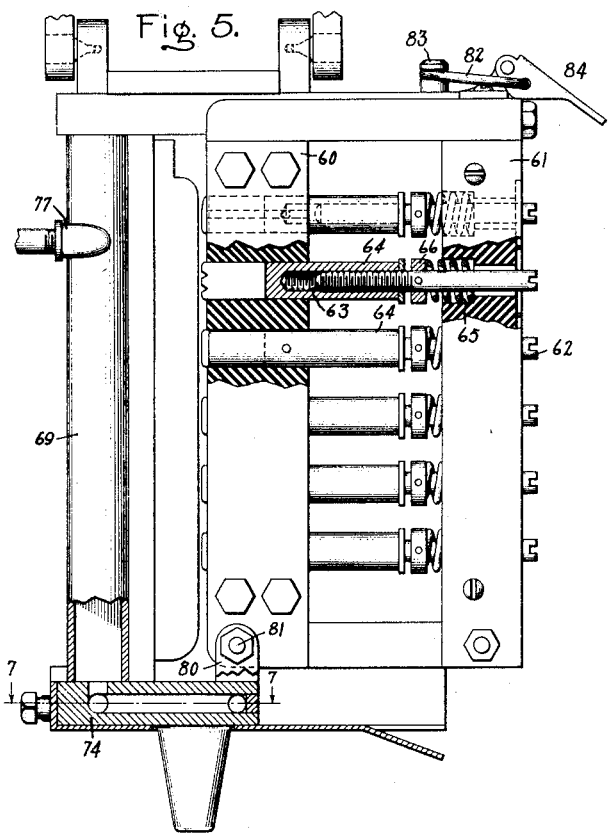
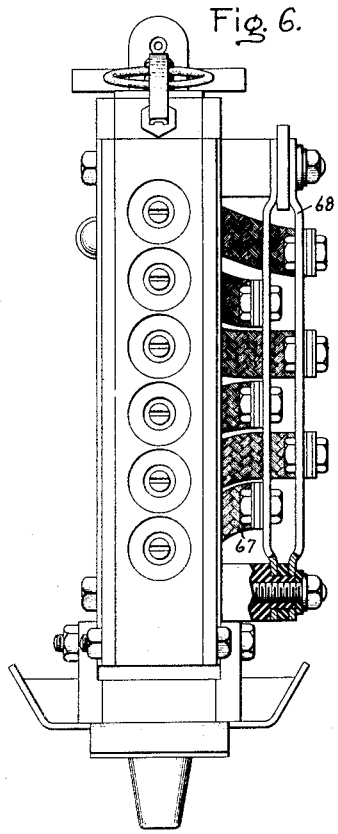
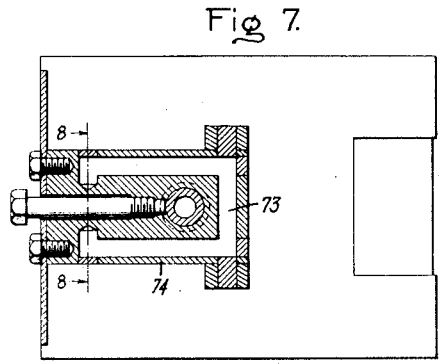
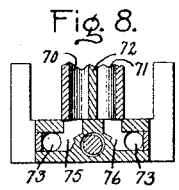
Inventor:
Verni J. Chapman.
by Harry E. Dunham
His Attorney.

Patented Oct. 1, 1940

2,216,564

UNITED STATES PATENT OFFICE 2,216,564

ARC WELDING

Verni J. Chapman, Schenectady, N. Y., assignor to General Electric Company, a corporation of New York Application September 16, 1938, Serial No. 230,266

7 Claims. (Cl. 219—8)

My invention relates to arc welding and particularly to arc welding machines for automatically feeding coated electrodes toward and away from the work to strike and thereafter maintain a welding arc.

It is an object of my invention to provide an improved contact making mechanism for supplying welding current to an electrode.

Further objects and advantages of my invention will become apparent as the following description proceeds and the features of novelty which characterize my invention will be pointed out with particularity in the claims annexed to and forming a part of this specification.

Figure 1:
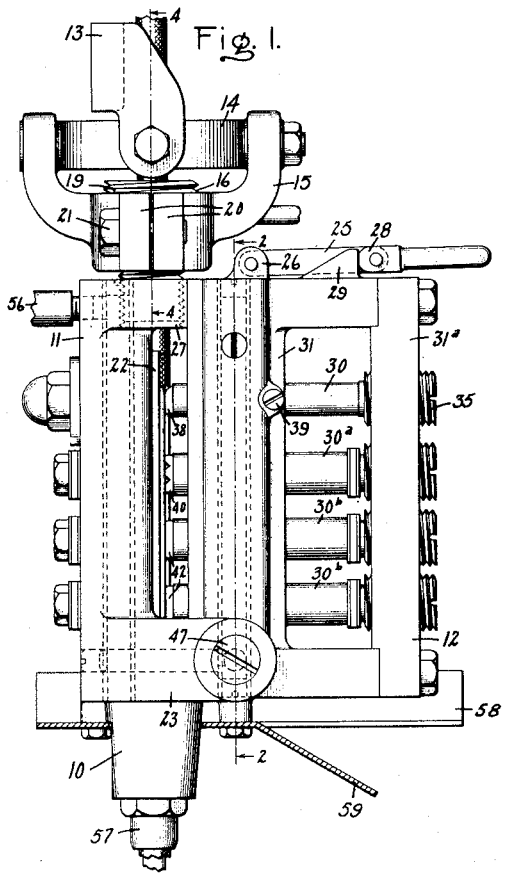
Figure 2:
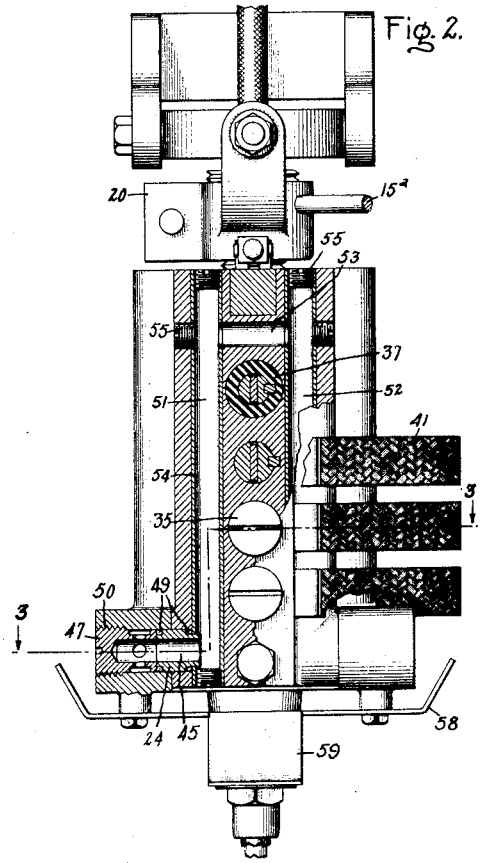
Figure 3:
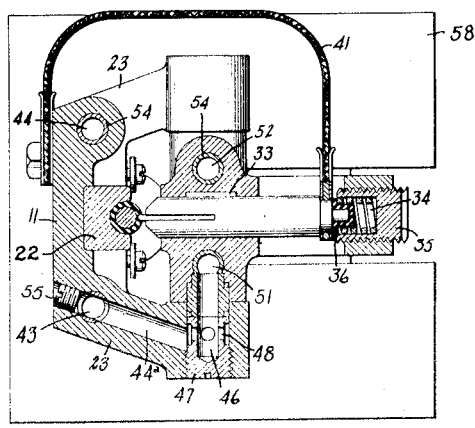
Figure 4:
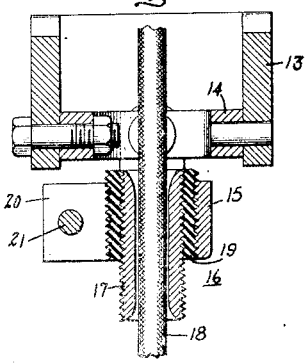

For a better understanding of my invention reference may be had to the accompanying drawings in which Fig. 1 is a side elevation of a contact making mechanism embodying the principles of my invention, Fig. 2 is an end view, partly in section, of the embodiment illustrated in Fig. 1, Fig. 3 is a horizontal section taken along the line 3—3 of Fig. 2, Fig. 4 is an enlarged view in section of a detail of my invention, Fig. 5 is a side view, partly in section, of a modification of the invention illustrated in Figs. 1 to 4, Fig. 6 is an end view of the modification illustrated in Fig. 5, Fig. 7 is a horizontal section taken along the line 7—7 of Fig. 5, and Fig. 8 is a detail in cross section taken along the line 8—8 of Fig. 7.

The contact making mechanism illustrated and described herein comprises a nozzle block 10 and a main frame 11 to which is pivotally attached at its lower end a hinged jaw or auxiliary frame 12 which includes a member 38 to cut a longitudinal groove through the flux coating of the electrode, a member 40 to abrade or scrape the bottom of the groove thus providing a clean, bright and smooth electrode surface, and current conducting means or brushes 42 for engaging the cleaned surface of the electrode. This arrangement insures a good electrical sliding contact between the current conducting means and the electrode which, it will be understood, is being fed through the contact making mechanism to the work. Whenever it is necessary, I intend to supply a cooling medium to the nozzle block 10 and one or both of the frames 11, 12 of the contact making mechanism. The pivoted or hinged connection between the main and auxiliary frames permits a particularly convenient and simple insertion of a new electrode. The cutting and scraping mechanisms and brushes include adjustable spring-biased fingers 30, 30a, and 30b which insure proper pressure on the electrode to carry out the prescribed functions. A wire guide or back-up member 22 is carried by main frame 10 in order to back up the pressure applied to the electrode by the mechanisms and brushes and thereby plays a part in insuring maintenance of the proper pressure on the electrode.

The contact making mechanism is adapted to be supported from an electrode feeding means (not shown) by a pivotal mounting. This pivotal mounting comprises a ring 14 pivotally supported about a diametrical axis of the ring from a bracket 13 which is designed to be secured to the welding head or other support. Ring 14 in turn pivotally supports the nozzle and contact mechanism about a diametrical axis located at right angles to the first mentioned axis by means of a yoke 15 and insulating coupling 16. This mounting arrangement permits the mechanism to be oscillated in the direction of welding or at right angles thereto as desired by tightening the proper axial pivot and imparting vertical motion to an arm 15a by means of a suitable oscillating system. This pivotal support is described and claimed in my Patent No. 2,198,472 entitled Oscillator mechanism, which was filed concurrently herewith and assigned to the same assignee as the present invention. This patent also describes and claims a suitable oscillating system that may be used to impart vertical motion to the arm 15a.

As best shown in Fig. 4, the insulating coupling includes a wire guide 17 provided with a central aperture through which electrode 18 is adapted to be fed. The exterior surface of guide 17 is threaded for engagement with corresponding interior threads on an insulating bushing 19. The exterior surface of insulating bushing 19 is also threaded to engage interior threads formed in the split body portion of yoke 15 which is provided with the lips 20. A threaded bolt 21 is employed to draw the lips 20 together to lock the insulating bushing 19 and guide 17 in any desired position. Wire guide 17 is firmly threaded into the main frame 11 of the contact making mechanism. The adjustable feature of the above-described insulating bushing provides flexibility inasmuch as the contact making mechanism may be held in any desired position. If desired, a solid yoke may be substituted for the split yoke 15 and the insulating bushing 19 may be slightly over-sized, of a deformable material and the threads may be omitted. In such a case the internal threads on the solid yoke will depress the insulating bushing, the resulting frictional engagement being sufficient to prevent undesired turning of the contact mechanism, but still allowing adjustment by the operator.

The use of the insulating bushing permits insulation of the feeding mechanism from the contact making mechanism and thereby eliminates any heating effect resulting from current flow in the feeding mechanism which otherwise might result when the current conducting brushes are not properly insulated from the frame. The use of the insulating bushing is advantageous for this purpose.

Main frame 11 carries a second wire guide or back-up member 22. At the lower end of main frame 11 recessed or grooved on the side facing the electrode I provide supporting arms 23 from which the auxiliary frame 12 is pivotally supported on pivot 24. The upper end of auxiliary frame 12 is maintained in the proper position with respect to main frame 11 by means of a locking arm 25 which is pivotally attached to ears 26 on arm 27 extending transversely from main frame 11. The locking arm 25 is provided with a cam portion 28 adapted to engage ears 29 on the auxiliary frame 12.

The hinged jaw or auxiliary frame 12 carries spring biased plungers or holders 30, 30a and 30b. Each plunger or finger is slotted at one end as best shown in Fig. 3 for the reception of a cutting tool, a grinding tool or a contact brush depending upon the position of the plunger or holder in the apparatus. The plungers are adapted to fit slidably in openings through metallic block 31 of frame 12. In order to prevent rotation of the plungers or fingers a key 33 is provided in the well-known manner. Each finger or plunger is biased toward the electrode engaging position by means of springs 34 mounted in adjustable bushings 35 and insulated from the plungers by caps 36 of insulating material. The bushings 35 are threaded in openings in metallic block 31a which openings match with the openings in block 31 for the plungers 30, 30a and 30b.

The top plunger 30 carries a cutting tool 38 and is electrically insulated from the block 31 by means of an insulating bushing 37, the bushing being secured against movement by a set screw 39. The cutting tool 38 has a knife edge which engages the fluxed surface of the electrode. When the cutting tool 38 is pressed against the electrode by the spring 34, the knife edge cuts or parts the coating of the electrode thus forming a longitudinal segmental slot or groove in the electrode coating exposing the electrode.

The next plunger, 30a, is provided with a tool 40 having a notched surface for engagement with the electrode, its function being to scrape or abrade the bottom of the slot in order to obtain a clean bright surface so that the contact brushes 30b may make good electric contact with the electrode. This plunger as well as the remaining plungers 30b carry current and are connected by shunts 41 of suitable material such as copper to the lefthand side of the main frame 11. The cutting and scraping tools are preferably of a hard material such as cementic carbide as disclosed in Patents 1,721,416 and Reissue 17,624 to Schroter, assigned to the same assignee as the present invention.

Plungers 30b are provided with brushes 42 which are essentially of the same construction as cutting tool 38 and the abrading tool 40 with the exception that the brushes 42 are provided with smooth surfaces. As pointed out above, the tension of the springs 34 and hence the pressure of the tool or brush on the electrode is adjusted by means of bushings 35. The pressure applied should be sufficient to force the tool or brush into firm engagement with the electrode and to provide a firm non-sparking engagement therewith. The pressure applied against the electrode 18 is backed up by the wire guide 22.

Whenever relatively large welding currents are employed such as 2,000 to 2,500 amperes, for example, it is necessary to provide artificial cooling for the nozzle block and frames. Also, in order to reduce the number of contact fingers with lower current, say 200 to 300 amperes, it may be desirable to provide artificial cooling. The nozzle block is heated by the heat of the welding arc and the frames and the plungers carried by the auxiliary frame become heated by reason of the heating effect of the welding current flowing through the connections between the plungers and the shunts 41 as well as the sliding connection between the electrode and the tools or brushes carried by the auxiliary frame and the wire guide 22 carried by the main frame. In the arrangement illustrated in Figs. 1 to 4, I have provided two cooling passages 43 and 44 respectively extending lengthwise of the main frame 11. These passages intersect with passages 44a in the arms 23 so that the cooling medium may be carried to the pivoted connection between the main and auxiliary frames. In order to cool the auxiliary frame I have provided a passageway 45 through the pivots 24 and a passageway 46 in plugs 47. Each plug 47 is provided with four radial openings 48 one of which communicates between the passage 46 and the passage 44a. In order to prevent leakage about the pivot 45 I have provided gaskets 49. Plug 47 is provided with threads engaging internal threads in a tapped hole 50 provided in the arms 23 of the main frame 11. It will be obvious that as plug 47 is screwed inwardly, gaskets 49 will be compressed and it will also be apparent that the four radial openings 48 have been provided so that communication between passages 44a and 46 will be insured for any position of the plug 47. I have provided cooling passages 51 and 52, respectively, lengthwise of block 31 in auxiliary frame 12, these passages being joined at the upper end of block 31 by a passage 53. A convenient way of forming the passages above described is to drill the frames. If desired, liners 54 may be inserted as indicated in Fig. 2 or the liners may be cast in the frames. These liners may be closed by plugs 55 or in any other suitable manner. From what has been said it will be apparent that a cooling medium introduced to the framework through an inlet conduit 56 will flow downwardly through the front side of the main frame to one hinge, through the hinge and up one side of the auxiliary frame, across the top of the auxiliary frame and down its opposite side to the other hinge and finally up the back side of the main frame to an outlet conduit. Of course, the flow may be reversed if desired. Also, the construction may be simplified by omitting the passages 45 in the pivots 24 and joining the lower ends of passages 43 and 51 and also passages 44 and 52 by suitable lengths of tubing.

In order to obtain the most efficient cooling, I make the frames 11 and 12, wire guide 22 and the plungers or members 30, 30a and 30b from material which readily conducts heat, as bronze or brass, for example. Moreover, I provide a close fit between the plungers and frame 12, and also between the frame 11 and the wire guide 22 to insure a maximum heat transfer therebetween. Finally, I arrange the frame 12 as close to the tip of the plungers as possible to minimize the distance between the tips and the cooling passages.

The electrode is fed from the contact mechanism to the work through a nozzle 57. The end of the main frame nearest the work may be provided with a shield or guard 58 to protect the mechanism from the direct heat of the arc. A tongue 59 is cut in shield 58 and bent downwardly to permit the auxiliary frame 12 to pivot on the main frame without interfering with the shield. In order to insert the electrode in the contact making mechanism the auxiliary frame 12 is first opened by releasing the locking arm 25. The electrode is then run down through the wire guide 17 and past the wire guide 22 until the end of the electrode enters the nozzle 57. The frame 12 is then closed and latched. Following this, preferably with the electrode moving, the top plunger 30 is tightened by means of the adjusting bushing 35 until the knife edge makes a clean cut through the electrode flux and engages the electrode core. Next, the plunger 30a is similarly adjusted until the abrading tool 40 properly engages the electrode. The remaining plungers are then adjusted to give equal pressure on the bared portion of the electrode. This pressure should be as great as possible without placing undue load on the electrode feeding mechanism. During the welding operation the tools or brush contacts should be inspected to see that there is no sparking, a condition which indicates insufficient pressure. When properly adjusted, each of the plungers carrying current will bear against the electrode with equal pressure and accordingly should heat up to the same degree. If a plunger runs cooler than the others, insufficient pressure is indicated and, conversely, if any brush or tool runs hotter than the others it is indicated that the pressure is too great.

In the modification illustrated in Figs. 5 to 8 inclusive, I have provided a contact making mechanism which is similar in most respects to that described above. However, in place of the metallic blocks 31 and 31a above described I have provided blocks 60 and 61 of a suitable insulating material, such as soapstone. Instead of the adjustable bushings 35 I provide adjusting screws 62 threaded to engage a tapped opening 63 in the end of each plunger 64. A spring bias is provided by means of springs 65 retained between collars 66 and recesses in the insulating block 61. It will be apparent that the pressure applied to the electrode may be adjusted by turning the screws 62 in one direction or the other. Pig tail connections 67 are provided for carrying the current between the plungers 64 and a shunt 68.

A simplified cooling arrangement is provided in this modification, it being unnecessary to cool the insulated block 60. In this modification I have provided a tubular main frame member 69 divided into two vertical passages 70 and 71 by means of a partition 72. Passage 70 communicates with a passage 73 in the nozzle block 74 by means of a passage 75. Inspection of Fig. 7 indicates that passage 73 extends entirely around the nozzle block 74 and communicates with passage 71 by means of passage 76. It will be apparent that the cooling medium supplied through inlet 77 will flow to the nozzle block through passage 70 and around the interior of the nozzle block to the passage 71 from whence the cooling medium will flow out of the frame through a suitable outlet, not shown.

This simplification of the cooling system permits the use of a simple pivotal connection between the auxiliary frame and the nozzle block 74 including ears 80 attached to the nozzle block and pins 81 extending through block 60 and ears 80.

A locking arrangement to maintain the main and auxiliary frames in their operative positions is provided comprising a locking ring 82 adapted to engage a notched pin 83. A locking lever 84 completes a toggle arrangement for latching or unlatching the latching ring 82.

While I have shown particular embodiments of my invention, I do not desire my invention to be limited to the particular constructions shown and described and I intend in the appended claims to cover all modifications within the spirit and scope of my invention.

What I claim as new and desire to secure by Letters Patent of the United States is:

1. In arc welding apparatus, a contact device for connecting a source of welding current to an electrode comprising a first frame, a second frame pivotally related to said first frame, means for holding said frames in a predetermined position relative to one another, a guide for said electrode on one of said frames, the side of said guide facing said electrode being recessed for the reception of said electrode, contact means including a brush supported by the other of said frames, means including said guide for holding said brush in engagement with said electrode when said frames are in said predetermined position, and means for supplying welding current to said brush.

2. In arc welding apparatus, a contact device for connecting a source of welding current to an electrode comprising a main frame, a second frame pivotally supported on said main frame, means for holding said frames in a predetermined position relative to one another, a guide for said electrode supported by said first frame, the side of said guide facing said electrode being recessed for the reception of said electrode, means carried by said second frame for cutting a groove through the flux coating of said electrode, contact means including a brush supported by said second frame, means including said guide for holding said brush and said cutting means in engagement with said electrode when said frames are in said predetermined position, means for supplying welding current to said brush, and means for individually adjusting the pressure of said brush and cutting means against said electrode.

3. In arc welding apparatus, contact mechanism for connecting a source of welding current to a flux coated electrode comprising a frame member, an auxiliary frame member pivotally connected to said frame member, means for holding said frame members in a predetermined position relative to one another, a guide for said electrode supported by said frame member, the side of said guide facing said electrode being recessed for the reception of said electrode, means carried by said auxiliary frame member for removing a portion of said flux coating from said electrode, means carried by said auxiliary frame member for scraping the surface of said electrode exposed by said first mentioned means, means carried by said auxiliary frame member for making a sliding contact with the scraped surface of said electrode, means including said guide for holding said last three mentioned means in engagement with said electrode when said frame members are in said predetermined position, and means for supplying welding current to said contact means.

4. In arc welding apparatus, a contact device for connecting a source of welding current to a flux coated electrode comprising a main frame, a second frame pivotally supported on said main frame, means for holding said frames in a predetermined position relative to one another, a guide for said electrode supported by said main frame, the side of said guide presented toward said electrode being recessed for the reception of said electrode, a flux cutting finger carried by said second frame for cutting a groove through the flux coating of said electrode, an abrading finger carried by said second frame arranged to enter said groove, a contact finger carried by said second frame arranged to enter said groove, means for biasing said fingers into engagement with said electrode when said frames are in said predetermined position, said guide serving to guide said electrode and to back up the pressure applied to said electrode, means for individually adjusting the pressure with which said fingers engage said electrode, insulating means interposed between said fingers and said biasing means and means for supplying welding current to said contact fingers.

5. Welding apparatus including a contact device for connecting a source of welding current to a flux-coated electrode comprising a frame member, an auxiliary frame member pivotally connected to said frame member, means for holding said frame members in a predetermined position relative to one another, contact members supported by one of said frame members, means for biasing said contact members into engagement with said electrode, means for supplying welding current to said contact members, conduits in said members for conducting a cooling medium in heat exchange relationship with said members, conduits in said pivotal connections joining the conduits in said members, and means to supply a cooling medium to said conduits.

6. Welding apparatus including a contact device for connecting a source of welding current to a flux-coated electrode comprising a frame, an auxiliary frame, contact members supported by one of said frames, means for biasing said contact members into engagement with said electrode, means for supplying welding current to said contact members, said frame being provided with passages, an inlet conduit connected with one of said passages for conducting a cooling medium to said frame, an outlet conduit connected with another of said passages for conducting said cooling fluid away from said frame, said auxiliary frame having pivotal connections with said first-mentioned frame, conduits passing through said pivotal connections and communicating with said passages, passages in said auxiliary frame for conducting said cooling medium through said auxiliary frame, said last-mentioned passages communicating with said conduits which pass through said pivotal connections whereby said cooling medium is circulated through said frames and said pivotal connections.

7. Welding apparatus comprising a supporting device, a contact device for connecting a source of welding current to an electrode and means to join said contact device and said supporting device, said means including a yoke having a threaded passage therethrough, means for attaching said yoke to one of said devices, a hollow, cylindrical, externally threaded wire guide for said electrode secured at one end to the other of said devices and a bushing of deformable material having electrically insulative properties between and making a threaded engagement with said yoke and the other end of said wire guide, said yoke being arranged to exert a clamping action on said bushing.

VERNI J. CHAPMAN.

CERTIFICATE OF CORRECTION.

Patent No. 2,216,564.　　　　　　　　　　　　　　　　　　　　October 1, 1940.

VERNI J. CHAPMAN.

It is hereby certified that error appears in the printed specification of the above numbered patent requiring correction as follows: Page 2, first column, lines 14 and 15, strike out the words "recessed or grooved on the side facing the electrode" and insert the same after "22" and before the period in line 13; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.